United States Patent
Tang (10) Patent No.: US 9,345,044 B2
(45) Date of Patent: May 17, 2016

(54) METHOD AND APPARATUS FOR PROCESSING INFORMATION

(71) Applicant: Huawei Technologies Co., Ltd., Shenzhen (CN)

(72) Inventor: Zhenfei Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 58 days.

(21) Appl. No.: 14/303,193

(22) Filed: Jun. 12, 2014

(65) Prior Publication Data

US 2014/0314012 A1    Oct. 23, 2014

Related U.S. Application Data

(63) Continuation of application No. PCT/CN2012/086763, filed on Dec. 17, 2012.

(30) Foreign Application Priority Data

Dec. 19, 2011 (CN) .......................... 2011 1 0426975

(51) Int. Cl.
  *H04W 72/12* (2009.01)
  *H04W 48/12* (2009.01)
  *H04W 76/00* (2009.01)
  *H04W 72/04* (2009.01)
  (Continued)

(52) U.S. Cl.
  CPC ......... *H04W 72/1294* (2013.01); *H04L 5/0057* (2013.01); *H04W 48/12* (2013.01); *H04W 72/0406* (2013.01); *H04W 76/00* (2013.01); *H04L 5/001* (2013.01); *H04L 5/0012* (2013.01); *H04W 80/00* (2013.01)

(58) Field of Classification Search
  CPC ................... H04W 72/1294; H04W 72/0406; H04W 48/12
  See application file for complete search history.

(56) References Cited

U.S. PATENT DOCUMENTS

2011/0038271 A1* 2/2011 Shin ..................... H04W 52/146
                                                          370/252
2011/0136495 A1   6/2011 Chen et al.
(Continued)

FOREIGN PATENT DOCUMENTS

CN      101640585 A      2/2010
CN      101651890 A      2/2010
(Continued)

OTHER PUBLICATIONS

3GPP, "Evolved Universal Terrestrial Radio Access (E-UTRA); Physical Channels and Modulation (Release 10)", Jun. 2011, 3GPP TS 36.211, V10.2.0, pp. 1-103.*

(Continued)

*Primary Examiner* — Paul H Masur
(74) *Attorney, Agent, or Firm* — Slater Matsil, LLP (57) ABSTRACT

Embodiments of the present invention disclose a method and an apparatus for processing information. A base station configures at least one physical uplink control channel format for a user equipment and then sends downlink control information of a physical downlink control channel to the user equipment, and finally activates or releases, through bit information configured in the downlink control information of the physical downlink control channel, the at least one physical uplink control channel format for the user equipment to feed back channel state information.

20 Claims, 2 Drawing Sheets

(51) Int. Cl.
*H04W 80/00* (2009.01)
*H04L 5/00* (2006.01)

(56) References Cited

U.S. PATENT DOCUMENTS

| | | | | |
|---|---|---|---|---|
| 2011/0205991 A1* | 8/2011 | Kim | H04W 72/0413 | 370/329 |
| 2011/0243066 A1* | 10/2011 | Nayeb Nazar | H04L 1/007 | 370/328 |
| 2012/0039322 A1* | 2/2012 | Tee | H04L 1/1887 | 370/338 |
| 2012/0113827 A1* | 5/2012 | Yamada | H04L 1/0031 | 370/252 |
| 2012/0159279 A1* | 6/2012 | Braithwaite | H04W 84/047 | 714/751 |
| 2013/0010706 A1* | 1/2013 | Kela | H04W 52/146 | 370/329 |

FOREIGN PATENT DOCUMENTS

| | | | | |
|---|---|---|---|---|
| CN | 101801093 A | 8/2010 | | |
| CN | 101808408 A | 8/2010 | | |
| KR | WO 2011155777 A2 * | 12/2011 | | H04W 24/00 |
| WO | 2011142640 A2 | 11/2011 | | |

OTHER PUBLICATIONS

3GPP, "Evolved Universal Terrestrial Radio Access (E-UTRA); Multiplexing and channel coding (Release 10)", Jun. 2011, 3GPP TS 36.212, V10.2.0, pp. 1-78.*

3GPP, "Evolved Universal Terrestrial Radio Access (E-UTRA); Physical layer procedures (Release 10)", Jun. 2011, 3GPP TS 36.213, V10.2.0, pp. 1-120.*

3GPP TS 36.211 V11.5.0 (Dec. 2013), 3rd Generation Partnership Project; Technical Specification Group Radio Access Network; Evolved Universal Terrestrial Radio Access (E-UTRA); Physical channels and modulation (Release 11), Dec. 2013, 120 pages.

3GPP TS 36.213 V11.5.0 (Dec. 2013), 3rd Generation Partnership Project; Technical Specification Group Radio Access Network; Evolved Universal Terrestrial Radio Access (E-UTRA); Physical layer procedures (Release 11), Dec. 2013, 182 pages.

International Search Report received in PCT/CN2012/086763, mailed Mar. 28, 2013, 10 pages.

"LTE; Evolved Universal Terrestrial Radio Access (E-UTRA); Physical Channels and Modulation (3GPP TS 36.211 Version 10.2.0 Release 10)," ETSI TS 136 211 V10.2.0, Jun. 2011, 105 pages.

"LTE; Evolved Universal Terrestrial Radio Access (E-UTRA); Multiplexing and Channel Coding (3GPP TS 36.212 Version 10.2.0 Release 10)," ETSI TS 136 212 V10.2.0, Jun. 2011, 80 pages.

"LTE; Evolved Universal Terrestrial Radio Access (E-UTRA); Physical Layer Procedures (3GPP TS 36.213 Version 10.2.0 Release 10)," ETSI TS 136 213 V10.2.0, Jun. 2011, 122 pages.

* cited by examiner

METHOD AND APPARATUS FOR PROCESSING INFORMATION

This application is a continuation of International Application No. PCT/CN2012/086763, filed on Dec. 17, 2012, which claims priority to Chinese Patent Application No. 201110426975.7, filed on Dec. 19, 2011, both of which are hereby incorporated by reference in their entireties.

TECHNICAL FIELD

The present invention relates to the field of communication systems, and in particular, to a method and an apparatus for processing information.

BACKGROUND

A CA (carrier aggregation) characteristic is introduced in LTE (long term evolution) version 10, so that multiple cells may simultaneously provide a data transmission service for one UE (, user equipment). To simultaneously obtain radio channel states of the multiple cells, an eNB (evolved Node B, evolved base station or node B) relies on measurement of the user equipment on channels of the multiple cells, and then CSI (channel state information) is fed back to the base station, based on which the base station performs scheduling.

For downlink performance, discarding CSI seriously affects downlink scheduling, including selection of a downlink mode and selection of a transmission layer and a precoding and modulation and coding scheme, so that the downlink performance is affected due to lack of reporting channel information. In the prior art, the base station performs pre-configuration through higher layer signaling, to notify the user equipment that which format is adopted to feed back CSI. The prior art may solve the problem that the downlink scheduling is seriously affected when multiple pieces of CSI simultaneously occur in one sub-frame and a pieces of CSI with a low priority level is discarded, but cannot flexibly allocate resources fed back in a CSI period, thereby resulting in low use efficiency of channel resources.

SUMMARY OF THE INVENTION

Embodiments of the present invention provide a method and an apparatus for processing information, which solve the problem of low use efficiency of channel resources when a user equipment transmits multiple cell pieces of CSI in one sub-frame.

In one aspect, the present invention provides a method for configuring downlink control information. A base station configures at least one physical uplink control channel format for a user equipment. The base station sends downlink control information of a physical downlink control channel to the user equipment. The downlink control information of the physical downlink control channel is in PDCCH DCI Format0 or PDCCH DCI Format1A or a PDCCH DCI format whose valid payload is the same as that of PDCCH DCI Format0. The base station activates or releases through bit information configured in the downlink control information of the physical downlink control channel the at least one physical uplink control channel format for the user equipment to feed back channel state information.

In another aspect, the present invention provides an apparatus for configuring downlink control information. A configuring unit is adapted to configure at least one physical uplink control channel format for a user equipment. A sending unit is adapted to send downlink control information of a physical downlink control channel to the user equipment. The downlink control information of the physical downlink control channel is in PDCCH DCI Format0 or PDCCH DCI Format1A or a PDCCH DCI format whose valid payload is the same as that of PDCCH DCI Format0. A processing unit is adapted to activate or release, through bit information configured in the downlink control information of the physical downlink control channel, the at least one physical uplink control channel format for the user equipment to feed back channel state information.

In still another aspect, the present invention provides a method for feeding back channel state information. A user equipment acquires at least one physical uplink control channel format configured by a base station for the user equipment. The user equipment acquires downlink control information of a physical downlink control channel corresponding to the user equipment from downlink control information of a physical downlink control channel sent by the base station. The downlink control information of the physical downlink control channel is in PDCCH DCI Format0 or PDCCH DCI Format1A or a PDCCH DCI format whose valid payload is the same as that of PDCCH DCI Format0. The user equipment feeds back channel state information according to a physical uplink control channel format which is activated by the base station through bit information configured in the downlink control information of the physical downlink control channel corresponding to the user equipment.

In yet another aspect, the present invention provides an apparatus for feeding back channel state information. An acquiring unit is adapted to acquire at least one physical uplink control channel format configured by a base station for a user equipment. The acquiring unit is further adapted to acquire downlink control information of a physical downlink control channel corresponding to the user equipment from downlink control information of a physical downlink control channel sent by the base station. The downlink control information of the physical downlink control channel is in PDCCH DCI Format0 or PDCCH DCI Format1A or a PDCCH DCI format whose valid payload is the same as that of PDCCH DCI Format0. A feedback unit is adapted to feed back channel state information according to a physical uplink control channel format which is activated by the base station through bit information configured in the downlink control information of the physical downlink control channel corresponding to the user equipment.

BRIEF DESCRIPTION OF THE DRAWINGS

To make the technical solutions of the present invention clearer, the accompanying drawings for illustrating the embodiments of the present invention or the prior art are given briefly below. Apparently, the accompanying drawings are only for the exemplary purpose, and persons of ordinary skill in the art can derive other drawings from the accompanying drawings without creative efforts.

DETAILED DESCRIPTION OF ILLUSTRATIVE EMBODIMENTS

The technical solutions of the present invention will be clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

In order to make the advantages of the technical solutions of the present invention clearer, the present invention is described in further detail below with reference to the accompanying drawings and embodiments.

Figure 1:
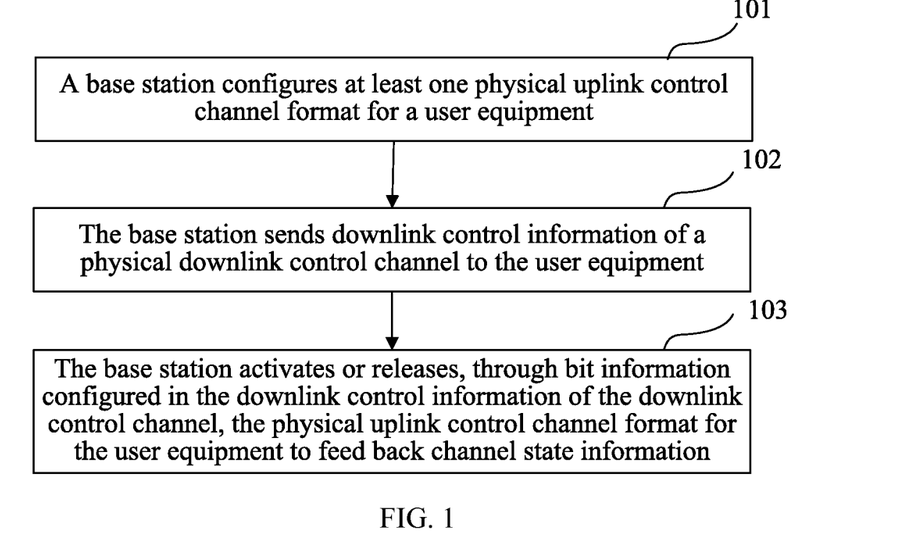
FIG. 1 is a flow chart of a method for configuring downlink control information according to an embodiment of the present invention.

FIG. 1 shows a method for configuring downlink control information according to an embodiment of the present invention. The method includes the following steps.

101: A base station configures at least one physical uplink control channel format for a user equipment.

Optionally, the base station may configure at least one physical uplink control channel format for the user equipment through radio resource control protocol RRC signaling.

For example, a base station eNB configures two formats, format 3 and format 4, for a user equipment through the radio resource control protocol RRC signaling. In this case, a structure of the RRC signaling is as follows:

```
MultiCSIFeedbackPUCCHConfig1 ::= SEQUENCE {
    n3PUCCH; ----------------- used for transferring format 3
resources of Multiple CSI
    n4PUCCH; ------------------ used for transferring format 4
resources of Multiple CSI
    feedBackPeriodicity; ------- feedback period of Multiple CSI
    ....; --------------------------- other information
}
```

When the eNB configures only one format for the UE, for example, configures PUCCH Format 5b, in this case, a structure of the RRC signaling is as follows:

```
MultiCSIFeedbackPUCCHConfig1 ::= SEQUENCE {
    n5bPUCCH; ------------------ used for transferring format 5b
resources of Multiple CSI
    feedBackPeriodicity; ------- feedback period of Multiple CSI
    ....; --------------------------- other information
}
```

102: The base station sends downlink control information of a physical downlink control channel to the user equipment.

The base station may send the downlink control information of the physical downlink control channel to the user equipment in a search space corresponding to the user equipment. Meanwhile, the base station configures a semi-persistent scheduling SPS C-RNTI or a channel state information CSI C-RNTI through high layer signaling, to scramble cyclic redundancy check CRC of the physical downlink control channel.

Further, in this way, the user equipment scrambles and acquires the downlink control information corresponding to the user equipment in the search space according to the semi-persistent scheduling SPS C-RNTI or the channel state information CSI C-RNTI configured by the base station. The downlink control information of the physical downlink control channel is in PDCCH DCI Format0 or PDCCH DCI Format1A or a PDCCH DCI format whose valid payload is the same as that of PDCCH DCI Format0.

103: The base station activates or releases, through bit information configured in the downlink control information of the downlink control channel, the physical uplink control channel format for the user equipment to feed back channel state information.

Specifically, when the base station configures one physical uplink control channel format for the user equipment and the downlink control information of the physical downlink control channel is in PDCCH DCI Format0, the base station configures a bit of resource block allocation and frequency hopping resource allocation of the downlink control information of the physical downlink control channel to all 1s, and configures a bit of a modulation and coding scheme and a redundancy version to all 0s, to perform the activating or releasing.

Alternatively, when the downlink control information of the physical downlink control channel is in PDCCH DCI Format0, the base station configures a bit of resource block allocation and frequency hopping resource allocation of the downlink control information of the physical downlink control channel to all 0s, and configures a bit of a modulation and coding scheme and a redundancy version to all 1s, to perform the activating or releasing.

Alternatively, when the downlink control information of the physical downlink control channel is in PDCCH DCI Format0, the base station configures a transmission power control TPC bit of the downlink control information of the physical downlink control channel to 00, configures a cyclic shift bit of a reference signal DMRS to 000, and configures a most significant bit of a modulation and coding scheme and a redundancy version to 0, to perform the activating or releasing.

Alternatively, when the downlink control information of the physical downlink control channel is in PDCCH DCI Format0, the base station configures a transmission power control TPC bit of the downlink control information of the physical downlink control channel to 00, configures a cyclic shift bit of a reference signal DMRS to 000, configures a bit of a modulation and coding scheme and a redundancy version to 11111, and configures a bit of resource block indication and frequency hopping resource allocation to all 1s, to perform the activating or releasing.

Further, when the downlink control information of the physical downlink control channel is in PDCCH DCI Format0, the base station indicates, through a channel state information request bit configured in the downlink control information of the physical downlink control channel, a manner for the user equipment to feed back a cell periodic channel state information report.

Specifically, the channel state information request bit may be set to 00, 01, 10, and 11, to indicate the user equipment to feed back periodic channel state information reports of different cells.

The cell periodic channel state information report may be a periodic channel state information report of a cell corresponding to the physical downlink control channel, or a periodic channel state information report of any cell group configured through RRC by the base station.

Alternatively, when the downlink control information of the physical downlink control channel is in PDCCH DCI Format1A, the base station configures a bit of resource block allocation of the downlink control information of the physical downlink control channel to all 1s, and configures a bit of a modulation and coding scheme to all 0s, to perform the activating or releasing; or the base station configures a bit of resource block allocation of the downlink control information of the physical downlink control channel to all 0s, and configures a bit of a modulation and coding scheme to all 1s, to perform the activating or releasing.

Alternatively, when the downlink control information of the physical downlink control channel is in PDCCH DCI Format1A, the base station configures a bit of a hybrid adaptive retransmission process number of the downlink control information of the physical downlink control channel to all 0s, configures a most significant bit of a modulation and coding scheme to 0, and configures a bit of a redundancy version to 00, to perform the activating or releasing.

Alternatively, when the downlink control information of the physical downlink control channel is in PDCCH DCI Format1A, the base station configures a bit of a hybrid adaptive retransmission process number of the physical downlink control channel to all 0s, configures a most significant bit of a modulation and coding scheme to 11111, configures a bit of a redundancy version to 00, and configures a bit of resource block indication to all 1s, to perform the activating or releasing.

When the base station configures two physical uplink control channel formats for the user equipment through the RRC signaling, and the downlink control information of the physical downlink control channel is in PDCCH DCI Format0, the base station activates a first physical uplink control channel format and releases a second physical uplink control channel format, by configuring a most significant bit MSB of transmission power control TPC, or configuring a cyclic shift MSB of a demodulation reference signal DMRS, or configuring a most significant bit or a least significant bit of a modulation and coding scheme and a redundancy version.

The first physical uplink control channel format may be any one of physical uplink control channel format 2/2a/2b, physical uplink control channel format 3, and other formats (for example, a physical uplink shared channel PUSCH) used for uplink control information transmission. The second physical uplink control channel format may be any one of physical uplink control channel format 2/2a/2b, physical uplink control channel format 3, and other formats (for example, a physical uplink shared channel PUSCH) used for uplink control information transmission. The first physical uplink control channel format is different from the second physical uplink control channel format.

Alternatively, when the downlink control information of the physical downlink control channel is in PDCCH DCI Format0, the base station activates the first physical uplink control channel format and releases check information of the second physical uplink control channel format, by configuring a bit of resource block allocation and frequency hopping resource allocation to all 1s, and configuring a bit of a modulation and coding scheme and a redundancy version to all 0s.

Alternatively, when the downlink control information of the physical downlink control channel is in PDCCH DCI Format0, the base station activates the first physical uplink control channel format and releases check information of the second physical uplink control channel format, by configuring a transmission power control TPC bit of the downlink control information of the physical downlink control channel to 00, configuring a cyclic shift bit of a reference signal DMRS to 000, and configuring a most significant bit of a modulation and coding scheme and a redundancy version to 0.

Alternatively, when the downlink control information of the physical downlink control channel is in PDCCH DCI Format0, the base station activates the first physical uplink control channel format and releases check information of the second physical uplink control channel format, by configuring a transmission power control TPC bit of the downlink control information of the physical downlink control channel to 00, configuring a cyclic shift bit of a reference signal DMRS to 000, configuring a bit of a modulation and coding scheme and a redundancy version to 11111, and configuring a bit of resource block indication and frequency hopping resource allocation to all 1s.

Alternatively, when the downlink control information of the physical downlink control channel is in PDCCH DCI Format1A, the base station activates the first physical uplink control channel format and releases the second physical uplink control channel format, by configuring an MSB of the TPC, or configuring a flag bit of centralized or distributed virtual resource block allocation, or configuring a most significant bit or a least significant bit of a modulation and coding scheme; or the base station activates the first physical uplink control channel format and releases check information of the second physical uplink control channel format, by configuring a bit of resource block allocation to all 1s, and configuring a bit of a modulation and coding scheme to all 0s.

Alternatively, when the downlink control information of the physical downlink control channel is in PDCCH DCI Format1A, the base station activates the first physical uplink control channel format and releases check information of the second physical uplink control channel format, by configuring a bit of a hybrid adaptive retransmission process number of the downlink control information of the physical downlink control channel to all 0s, configuring a most significant bit of a modulation and coding scheme to 0, and configuring a bit of a redundancy version to 00.

Alternatively, when the downlink control information of the physical downlink control channel is in PDCCH DCI Format1A, the base station activates the first physical uplink control channel format and releases check information of the second physical uplink control channel format, by configuring a bit of a hybrid adaptive retransmission process number of the physical downlink control channel to all 0s, configuring a most significant bit of a modulation coding scheme to 11111, configuring a bit of a redundancy version to 00, and configuring a bit of resource block indication to all 1s.

Figure 2:
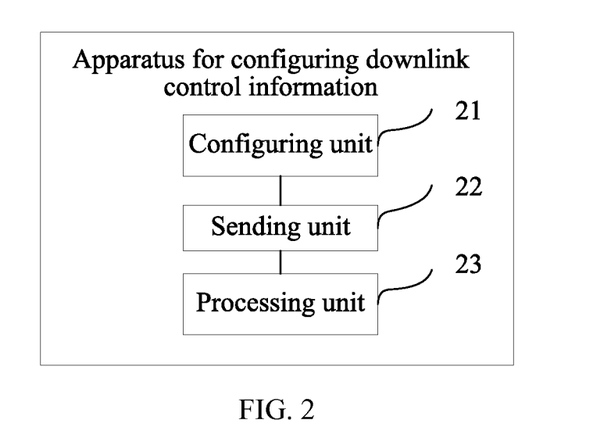
FIG. 2 is a schematic structural diagram of an apparatus for configuring downlink control information according to an embodiment of the present invention.

FIG. 2 shows an apparatus for configuring downlink control information according to an embodiment of the present invention. The apparatus for configuring downlink control information may be a base station, and the apparatus includes: a configuring unit 21, a sending unit 22, and a processing unit 23.

The configuring unit 21 is adapted to configure at least one physical uplink control channel format for a user equipment.

The configuring unit 21 may be a transmitter.

Optionally, the configuring unit 21 may configure at least one physical uplink control channel format for the user equipment through radio resource control protocol RRC signaling.

For example, a base station eNB configures two formats, format 3 and format 4, for a user equipment through the radio resource control protocol RRC signaling. In this case, a structure of the RRC signaling is as follows:

```
MultiCSIFeedbackPUCCHConfig1 ::= SEQUENCE {
    n3PUCCH; ------------------ used for transferring format 3
resources of Multiple CSI
    n4PUCCH; ------------------ used for transferring format 4
resources of Multiple CSI
    feedBackPeriodicity; ------- feedback period of Multiple CSI
    ....; -------------------------- other information
}
```

When the eNB configures only one format for the UE, for example, configures PUCCH Format 5b, in this case, a structure of the RRC signaling is as follows:

```
MultiCSIFeedbackPUCCHConfig1 ::= SEQUENCE {
    n5bPUCCH; ------------------ used for transferring format 5b
resources of Multiple CSI
    feedBackPeriodicity; ------- feedback period of Multiple CSI
    ....; -------------------------- other information
}
```

The sending unit 22 is adapted to send downlink control information of a physical downlink control channel to the user equipment, where the downlink control information of the physical downlink control channel is in PDCCH DCI Format0 or PDCCH DCI Format1A or a PDCCH DCI format whose valid payload is the same as that of PDCCH DCI Format0.

The sending unit 22 may be a transmitter.

The processing unit 23 is adapted to activate or release, through bit information configured in the downlink control information of the physical downlink control channel, the at least one physical uplink control channel format for the user equipment to feed back channel state information.

The processing unit 23 may be a processor.

When the configuring unit 21 configures one physical uplink control channel format for the user equipment, the processing unit 23 is further adapted to: when the downlink control information of the physical downlink control channel is in PDCCH DCI Format0, configure a bit of resource block allocation and frequency hopping resource allocation of the downlink control information of the physical downlink control channel to all 1s, and configure a bit of a modulation and coding scheme and a redundancy version to all 0s, to perform the activating or releasing.

The processing unit 23 is further adapted to: when the downlink control information of the physical downlink control channel is in PDCCH DCI Format0, configure a bit of resource block allocation and frequency hopping resource allocation of the downlink control information of the physical downlink control channel to all 0s, and configure a bit of a modulation and coding scheme and a redundancy version to all 1s, to perform the activating or releasing.

The processing unit 23 is further adapted to: when the downlink control information of the physical downlink control channel is in PDCCH DCI Format0, configure a power control TPC bit of the physical downlink control channel to 00, configure a cyclic shift bit of a reference signal DMRS to 000, and configure a most significant bit of a modulation and coding scheme and a redundancy version to 0, to perform the activating or releasing.

The processing unit 23 is further adapted to: when the downlink control information of the physical downlink control channel is in PDCCH DCI Format0, configure a power control TPC bit of the physical downlink control channel to 00, configure a cyclic shift bit of a reference signal DMRS to 000, and configure a bit of a modulation and coding scheme and a redundancy version to 11111, to perform the activating or releasing.

The processing unit 23 is further adapted to: when the downlink control information of the physical downlink control channel is in PDCCH DCI Format0, the base station indicates, through a channel state information request bit configured in the downlink control information of the physical downlink control channel, a manner for the user equipment to feed back a cell periodic channel state information report.

The cell periodic channel state information report may be a periodic channel state information report of a cell corresponding to the physical downlink control channel, or a periodic channel state information report of any cell group configured through RRC.

The processing unit 23 is further adapted to: when the downlink control information of the physical downlink control channel is in PDCCH DCI Format1A, configure a bit of resource block allocation of the downlink control information of the physical downlink control channel to all 1s, and configure a bit of a modulation and coding scheme to all 0s, to perform the activating or releasing; or configure a bit of resource block allocation of the downlink control information of the physical downlink control channel to all 0s, and configure a bit of a modulation and coding scheme to all 1s, to perform the activating or releasing.

The processing unit 23 is further adapted to: when the downlink control information of the physical downlink control channel is in PDCCH DCI Format1A, configure a bit of a hybrid adaptive retransmission process number of the downlink control information of the physical downlink control channel to all 0s, configure a most significant bit of a modulation and coding scheme to 0, and configure a bit of a redundancy version to 00, to perform the activating or releasing.

The processing unit 23 is further adapted to: when the downlink control information of the physical downlink control channel is in PDCCH DCI Format1A, configure a bit of a hybrid adaptive retransmission process number of the physical downlink control channel to all 0s, configure a most significant bit of a modulation and coding scheme to 11111, configure a bit of a redundancy version to 00, and configure a bit of resource block indication to all 1s, to perform the activating or releasing.

When the configuring unit 23 configures two physical uplink control channel formats for the user equipment, the processing unit 23 is further adapted to: when the downlink control information of the physical downlink control channel is in PDCCH DCI Format0, activate a first physical uplink control channel format and release a second physical uplink control channel format, by configuring a most significant bit MSB of transmission power control TPC, or configuring a cyclic shift MSB of a demodulation reference signal DMRS, or configuring a most significant bit or a least significant bit of a modulation and coding scheme and a redundancy version.

The first physical uplink control channel format may be any one of physical uplink control channel format 2/2a/2b, physical uplink control channel format 3, and other formats (for example, a physical uplink shared channel PUSCH) used for uplink control information transmission. The second physical uplink control channel format may be any one of physical uplink control channel format 2/2a/2b, physical uplink control channel format 3, and other formats (for example, a physical uplink shared channel PUSCH) used for uplink control information transmission. The first physical uplink control channel format is different from the second physical uplink control channel format.

The processing unit 23 is further adapted to: when the downlink control information of the physical downlink control channel is in PDCCH DCI Format0, activate the first physical uplink control channel format and release check information of the second physical uplink control channel format, by configuring a bit of resource block allocation and frequency hopping resource allocation to all 1s, and configuring a bit of a modulation and coding scheme and a redundancy version to all 0s.

The processing unit 23 is further adapted to: when the downlink control information of the physical downlink control channel is in PDCCH DCI Format0, activate the first physical uplink control channel format and release check information of the second physical uplink control channel format, by configuring a transmission power control TPC bit of the physical downlink control channel to 00, configuring a cyclic shift bit of a reference signal DMRS to 000, and configuring a most significant bit of a modulation and coding scheme and a redundancy version to 0.

The processing unit 23 is further adapted to: when the downlink control information of the physical downlink control channel is in PDCCH DCI Format0, activate the first physical uplink control channel format and release check information of the second physical uplink control channel format, by configuring a transmission power control TPC bit of the downlink control information of the physical downlink control channel to 00, configuring a cyclic shift bit of a reference signal DMRS to 000, configuring a bit of a modulation and coding scheme and a redundancy version to 11111, and configuring a bit of resource block indication and frequency hopping resource allocation to all 1s.

The processing unit 23 is further adapted to: when the downlink control information of the physical downlink control channel is in PDCCH DCI Format1A, activate the first physical uplink control channel format and release the second physical uplink control channel format, by configuring an MSB of the TPC, or configuring a flag bit of centralized or distributed virtual resource block allocation, or configuring a most significant bit or a least significant bit of a modulation and coding scheme; or activate the first physical uplink control channel format and release check information of the second physical uplink control channel format, by configuring a bit of resource block allocation to all 1s, and configuring a bit of a modulation and coding scheme to all 0s.

The processing unit 23 is further adapted to: when the downlink control information of the physical downlink control channel is in PDCCH DCI Format1A, activate the first physical uplink control channel format and release check information of the second physical uplink control channel format, by configuring a bit of a hybrid adaptive retransmission process number of the downlink control information of the physical downlink control channel to all 0s, configuring a most significant bit of a modulation and coding scheme to 0, and configuring a bit of a redundancy version to 00.

The processing unit 23 is further adapted to: when the downlink control information of the physical downlink control channel is in PDCCH DCI Format1A, activate the first physical uplink control channel format and release check information of the second physical uplink control channel format, by configuring a bit of a hybrid adaptive retransmission process number of the physical downlink control channel to all 0s, configuring a most significant bit of a modulation and coding scheme to 11111, configuring a bit of a redundancy version to 00, and configuring a bit of resource block indication to all 1s.

Optionally, the apparatus may further include: a receiving unit 24.

The receiving unit 24 is adapted to receive channel state information transmitted through the activated physical uplink control channel format by the user equipment.

The receiving unit 24 may be a receiver.

Figure 3:
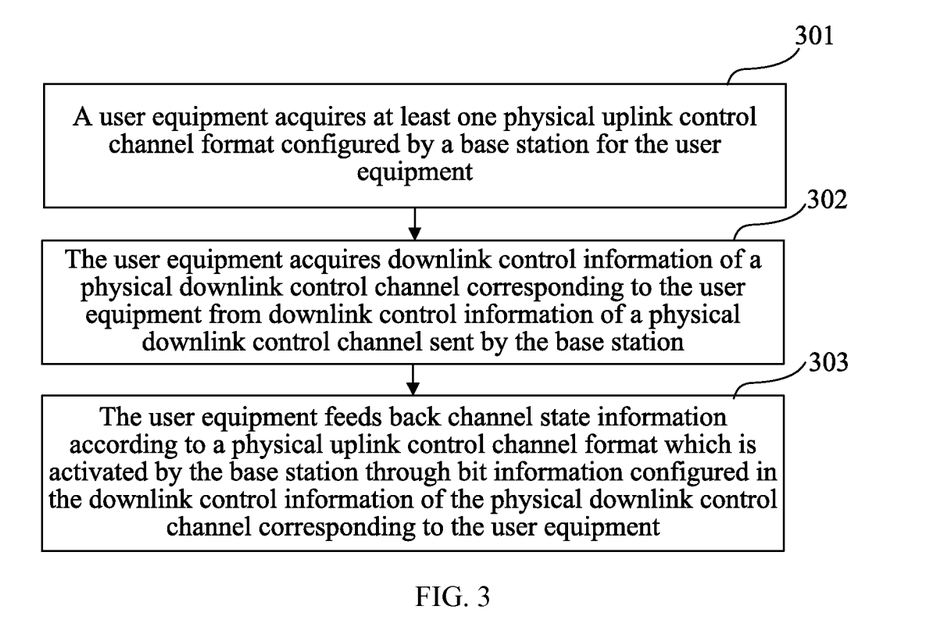
FIG. 3 is a flow chart of a method for feeding back channel state information according to an embodiment of the present invention.

FIG. 3 shows a method for feeding back channel state information according to an embodiment of the present invention. The method includes the following steps.

Step 301: A user equipment acquires at least one physical uplink control channel format configured by a base station for the user equipment.

For example, a base station eNB configures two formats, format 3 and format 4, for a user equipment through radio resource control protocol RRC signaling. In this case, a structure of the RRC signaling is as follows:

```
MultiCSIFeedbackPUCCHConfig1 ::= SEQUENCE {
    n3PUCCH; ------------------ used for transferring format 3
resources of Multiple CSI
    n4PUCCH; ------------------ used for transferring format 4
resources of Multiple CSI
    feedBackPeriodicity; ------- feedback period of Multiple CSI
    ....; --------------------------- other information
}
```

When the eNB configures only one format for the UE, for example, configures PUCCH Format 5b, in this case, a structure of RRC signaling is as follows:

```
MultiCSIFeedbackPUCCHConfig1 ::= SEQUENCE {
    n5bPUCCH; ------------------ used for transferring format 5b
resources of Multiple CSI
    feedBackPeriodicity; ------- feedback period of Multiple CSI
    ....; --------------------------- other information
}
```

302: The user equipment acquires downlink control information of a physical downlink control channel corresponding to the user equipment from downlink control information of a physical downlink control channel sent by the base station.

The downlink control information of the physical downlink control channel is in PDCCH DCI Format0 or PDCCH DCI Format1A or a PDCCH DCI format whose valid payload is the same as that of PDCCH DCI Format0. Specifically, the base station may send the downlink control information of the physical downlink control channel to the user equipment in a search space corresponding to the user equipment, and the user equipment scrambles and acquires the downlink control information of the physical downlink control channel corresponding to the user equipment according to a semi-persistent scheduling SPS C-RNTI or channel state information CSI C-RNTI which is configured by the base station through higher layer signaling for cyclic redundancy check CRC of the physical downlink control channel.

In a given user-level search space, the user equipment performs searching according to different valid payload sizes, and a search is referred to as a blind detection. The number of times of blind detection is related to a type of each PDCCH DCI valid payload size, and the same valid payload size is of one type. The more types there are, the more the number of the times of blind detection is. A valid payload size of the PDCCH DCI format in the present invention is the same as that of DCI Format0/1A, thereby avoiding increasing the number of the times of blind detection.

303: The user equipment feeds back channel state information according to a physical uplink control channel format which is activated by the base station through bit information configured in the downlink control information of the physical downlink control channel corresponding to the user equipment.

Specifically, when the user equipment acquires one physical uplink control channel format and the downlink control information of the physical downlink control channel is in PDCCH DCI Format0, the user equipment feeds back the channel state information through a detected physical uplink control channel format which is activated by the base station by configuring a bit of resource block allocation and frequency hopping resource allocation of the downlink control information of the physical downlink control channel to all 1s, and configuring a bit of a modulation and coding scheme and a redundancy version to all 0s.

Alternatively, when the downlink control information of the physical downlink control channel is in PDCCH DCI Format0, the user equipment feeds back the channel state information through a detected physical uplink control channel format which is activated by the base station by configuring a bit of resource block allocation and frequency hopping resource allocation of the downlink control information of the physical downlink control channel to all 0s, and configuring a bit of a modulation and coding scheme and a redundancy version to all 1s.

Alternatively, when the downlink control information of the physical downlink control channel is in PDCCH DCI Format0, the user equipment feeds back the channel state information through a detected physical uplink control channel format which is activated by the base station by configuring a transmission power control TPC bit of the downlink control information of the physical downlink control channel to 00, configuring a cyclic shift bit of a reference signal DMRS to 000, and configuring a most significant bit of a modulation and coding scheme and a redundancy version to 0.

Alternatively, when the downlink control information of the physical downlink control channel is in PDCCH DCI Format0, the user equipment feeds back the channel state information through a detected physical uplink control channel format which is activated by the base station by configuring a transmission power control TPC bit of the downlink control information of the physical downlink control channel to 00, configuring a cyclic shift bit of a reference signal DMRS to 000, and configuring a bit of a modulation and coding scheme and a redundancy version to 11111.

Alternatively, when the downlink control information of the physical downlink control channel is in PDCCH DCI Format0, the channel state information is fed back through a physical uplink control channel format which is activated by the base station by configuring a transmission power control TPC bit of the downlink control information of the physical downlink control channel to 00, configuring a cyclic shift bit of a reference signal DMRS to 000, configuring a bit of a modulation and coding scheme and a redundancy version to 11111, and configuring a bit of resource block indication and frequency hopping resource allocation to all 1s.

Further, when the downlink control information of the physical downlink control channel is in PDCCH DCI Format0, the user equipment acquires a manner for feeding back a cell periodic channel state information report, according to information indicated by the base station through a channel state information request bit configured in the downlink control information of the physical downlink control channel.

The channel state information request bit may be set by the base station to 00, 01, 10, and 11, to indicate periodic channel state information reports of different cells. The cell periodic channel state information report may be a periodic channel state information report of a cell corresponding to the physical downlink control channel, or a periodic channel state information report of any cell group configured through RRC by the base station.

Alternatively, when the downlink control information of the physical downlink control channel is in PDCCH DCI Format1A, the user equipment feeds back the channel state information through a detected physical uplink control channel format which is activated by the base station by configuring a bit of resource block allocation of the downlink control information of the physical downlink control channel to all 1s, and configuring a bit of a modulation and coding scheme to all 0s; or the user equipment feeds back the channel state information through a detected physical uplink control channel format which is activated by the base station by configuring a bit of resource block allocation of the downlink control information of the physical downlink control channel to all 0s, and configuring a bit of a modulation and coding scheme to all 1s.

Alternatively, when the downlink control information of the physical downlink control channel is in PDCCH DCI Format1A, the user equipment feeds back the channel state information through a detected physical uplink control channel format which is activated by the base station by configuring a bit of a hybrid adaptive retransmission process number of the downlink control information of the physical downlink control channel to all 0s, configuring a most significant bit of a modulation and coding scheme to 0, and configuring a bit of a redundancy version to 00.

Alternatively, when the downlink control information of the physical downlink control channel is in PDCCH DCI Format1A, the user equipment feeds back the channel state information through a detected physical uplink control channel format which is activated by the base station by configuring a bit of a hybrid adaptive retransmission process number of the physical downlink control channel to all 0s, configuring a most significant bit of a modulation and coding scheme to 11111, configuring a bit of a redundancy version to 00, and configuring a bit of resource block indication to all 1s.

When the user equipment acquires two physical uplink control channel formats and the downlink control information of the physical downlink control channel is in PDCCH DCI Format0, the user equipment feeds back the channel state information through a detected first physical uplink control channel format which is activated by the base station by configuring a most significant bit MSB of transmission power control TPC, or configuring a cyclic shift MSB of a demodulation reference signal DMRS, or configuring a most significant bit or a least significant bit of a modulation and coding scheme and a redundancy version.

Alternatively, when the downlink control information of the physical downlink control channel is in PDCCH DCI Format0, the user equipment feeds back the channel state information through a detected first physical uplink control channel format which is activated by the base station by configuring a bit of resource block allocation and frequency hopping resource allocation to all 1s, and configuring a bit of a modulation and coding scheme and a redundancy version to all 0s.

Alternatively, when the downlink control information of the physical downlink control channel is in PDCCH DCI Format0, the user equipment feeds back the channel state information through a detected first physical uplink control channel format which is activated by the base station by configuring a transmission power control TPC bit of the downlink control information of the physical downlink control channel to 00, configuring a cyclic shift bit of a reference signal DMRS to 000, and configuring a most significant bit of a modulation and coding scheme and a redundancy version to 0.

Alternatively, when the downlink control information of the physical downlink control channel is in PDCCH DCI Format0, the user equipment feeds back the channel state information through a detected first physical uplink control channel format which is activated by the base station by configuring a transmission power control TPC bit of the downlink control information of the physical downlink control channel to 00, configuring a cyclic shift bit of a reference signal DMRS to 000, configuring a bit of a modulation and coding scheme and a redundancy version to 11111, and configuring a bit of resource block indication and frequency hopping resource allocation to all 1s.

Alternatively, when the downlink control information of the physical downlink control channel is in PDCCH DCI Format1A, the user equipment feeds back the channel state information through a detected first physical uplink control channel format which is activated by the base station by configuring an MSB of the TPC, or configuring a flag bit of centralized or distributed virtual resource block allocation, or configuring a most significant bit or a least significant bit of a modulation and coding scheme; or the user equipment feeds back the channel state information through a detected first physical uplink control channel format which is activated by the base station by configuring a bit of resource block allocation to all 1s, and configuring a bit of a modulation and coding scheme to all 0s.

Figure 4:
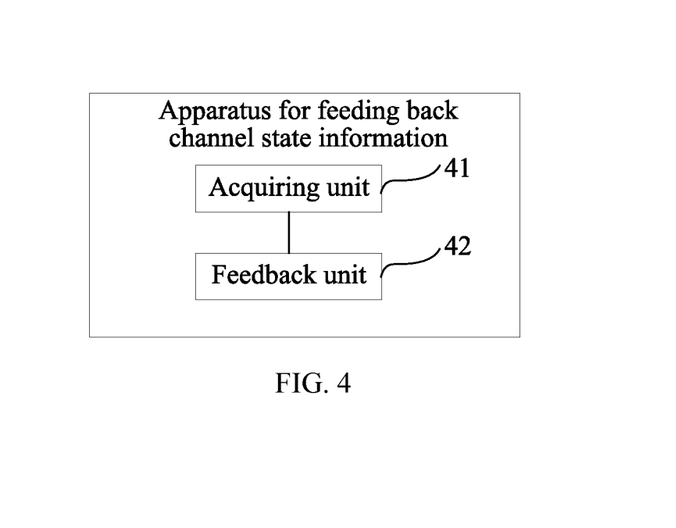
FIG. 4 is a schematic structural diagram of an apparatus for feeding back channel state information according to an embodiment of the present invention.

FIG. 4 shows an apparatus for feeding back channel state information according to an embodiment of the present invention. The apparatus for feeding back channel state information may be a user equipment, and the apparatus includes: an acquiring unit 41 and a feedback unit 42.

The acquiring unit 41 is adapted to acquire at least one physical uplink control channel format configured by a base station for a user equipment.

The acquiring unit 41 may be a receiver.

The acquiring unit 41 is further adapted to acquire downlink control information of a physical downlink control channel corresponding to the user equipment from downlink control information of a physical downlink control channel sent by the base station.

The downlink control information of the physical downlink control channel is in PDCCH DCI Format0 or PDCCH DCI Format1A or a PDCCH DCI format whose valid payload is the same as that of PDCCH DCI Format0.

The feedback unit 42 is adapted to feed back channel state information according to a physical uplink control channel format which is activated by the base station through bit information configured in the downlink control information of the physical downlink control channel corresponding to the user equipment.

The feedback unit 42 may be a transmitter.

When the base station configures one physical uplink control channel format for the user equipment, the feedback unit 42 is further adapted to: when the downlink control information of the physical downlink control channel is in PDCCH DCI Format0, feed back the channel state information through a detected physical uplink control channel format which is activated by the base station by configuring a bit of resource block allocation and frequency hopping resource allocation of the downlink control information of the physical downlink control channel to all 1s, and configuring a bit of a modulation and coding scheme and a redundancy version to all 0s.

The feedback unit 42 is further adapted to: when the downlink control information of the physical downlink control channel is in PDCCH DCI Format0, feed back the channel state information through a detected physical uplink control channel format which is activated by the base station by configuring a bit of resource block allocation and frequency hopping resource allocation of the downlink control information of the physical downlink control channel to all 0s, and configuring a bit of a modulation and coding scheme and a redundancy version to all 1s.

The feedback unit 42 is further adapted to: when the downlink control information of the physical downlink control channel is in PDCCH DCI Format0, feed back the channel state information through a detected physical uplink control channel format which is activated by the base station by configuring a transmission power control TPC bit of the physical downlink control channel to 00, configuring a cyclic shift bit of a reference signal DMRS to 000, and configuring a most significant bit of a modulation and coding scheme and a redundancy version to 0.

The feedback unit 42 is further adapted to: when the downlink control information of the physical downlink control channel is in PDCCH DCI Format0, feed back the channel state information through a detected physical uplink control channel format which is activated by the base station by configuring a transmission power control TPC bit of the physical downlink control channel to 00, configuring a cyclic shift bit of a reference signal DMRS to 000, and configuring a bit of a modulation and coding scheme and a redundancy version to 11111.

The feedback unit 42 is further adapted to: when the downlink control information of the physical downlink control channel is in PDCCH DCI Format0, feed back the channel state information through a detected physical uplink control channel format which is activated by the base station by configuring a transmission power control TPC bit of the downlink control information of the physical downlink control channel to 00, configuring a cyclic shift bit of a reference signal DMRS to 000, configuring a bit of a modulation and coding scheme and a redundancy version to 11111, and configuring a bit of resource block indication and frequency hopping resource allocation to all 1s.

The feedback unit 42 is further adapted to: when the downlink control information of the physical downlink control channel is in PDCCH DCI Format1A, feed back the channel state information through a detected physical uplink control channel format which is activated by the base station by configuring a bit of resource block allocation of the downlink control information of the physical downlink control channel to all 1s, and configuring a bit of a modulation and coding scheme to all 0s; or feed back the channel state information through a detected physical uplink control channel format which is activated by the base station by configuring a bit of resource block allocation of the downlink control information of the physical downlink control channel to all 0s, and configuring a bit of a modulation and coding scheme to all 1s.

The feedback unit 42 is further adapted to: when the downlink control information of the physical downlink control channel is in PDCCH DCI Format1A, feed back the channel state information through a detected physical uplink control channel format which is activated by the base station by configuring a bit of a hybrid adaptive retransmission process number of the downlink control information of the physical downlink control channel to all 0s, configuring a most significant bit of a modulation and coding scheme to 0, and configuring a bit of a redundancy version to 00.

The feedback unit 42 is further adapted to: when the downlink control information of the physical downlink control channel is in PDCCH DCI Format1A, feed back the channel state information through a detected physical uplink control channel format which is activated by the base station by configuring a bit of a hybrid adaptive retransmission process number of the physical downlink control channel to all 0s, configuring a most significant bit of a modulation and coding scheme to 11111, configuring a bit of a redundancy version to 00, and configuring a bit of resource block indication to all 1s.

The feedback unit 42 is further adapted to: when the downlink control information of the physical downlink control channel is in PDCCH DCI Format0, acquire a manner for feeding back a cell periodic channel state information report, according to information indicated by the base station through a channel state information request bit configured in the downlink control information of the physical downlink control channel.

The cell periodic channel state information report is a periodic channel state information report of a cell corresponding to the physical downlink control channel, or a periodic channel state information report of any cell group configured through RRC by the base station.

When the base station acquires two physical uplink control channel formats for the user equipment, the feedback unit 42 is further adapted to: when the downlink control information of the physical downlink control channel is in PDCCH DCI Format0, feed back the channel state information through a detected first physical uplink control channel format which is activated by the base station by configuring a most significant bit MSB of transmission power control TPC, or configuring a cyclic shift MSB of a demodulation reference signal DMRS, or configuring a most significant bit or a least significant bit of a modulation and coding scheme and a redundancy version.

The feedback unit 42 is further adapted to: when the downlink control information of the physical downlink control channel is in PDCCH DCI Format0, feed back the channel state information through a detected first physical uplink control channel format which is activated by the base station by configuring a bit of resource block allocation and frequency hopping resource allocation to all 1s, and configuring a bit of a modulation and coding scheme and a redundancy version to all 0s.

The feedback unit 42 is further adapted to: when the downlink control information of the physical downlink control channel is in PDCCH DCI Format0, feed back the channel state information through a detected first physical uplink control channel format which is activated by the base station by configuring a transmission power control TPC bit of the physical downlink control channel to 00, configuring a cyclic shift bit of a reference signal DMRS to 000, and configuring a most significant bit of a modulation and coding scheme and a redundancy version to 0.

The feedback unit 42 is further adapted to: when the downlink control information of the physical downlink control channel is in PDCCH DCI Format0, feed back the channel state information through a detected first physical uplink control channel format which is activated by the base station by configuring a transmission power control TPC bit of the physical downlink control channel to 00, configuring a cyclic shift bit of a reference signal DMRS to 000, and configuring a bit of a modulation and coding scheme and a redundancy version to 11111.

The feedback unit 42 is further adapted to: when the downlink control information of the physical downlink control channel is in PDCCH DCI Format1A, feed back the channel state information through a detected first physical uplink control channel format which is activated by the base station by configuring an MSB of the TPC, or configuring a flag bit of centralized or distributed virtual resource block allocation, or configuring a most significant bit or a least significant bit of a modulation and coding scheme; or feed back the channel state information through a detected first physical uplink control channel format which is activated by the base station by configuring a bit of resource block allocation to all 1s, and configuring a bit of a modulation and coding scheme to all 0s.

The feedback unit 42 is further adapted to: when the downlink control information of the physical downlink control channel is in PDCCH DCI Format1A, feed back the channel state information through a detected first physical uplink control channel format which is activated by the base station by configuring a bit of a hybrid adaptive retransmission process number of the downlink control information of the physical downlink control channel to all 0s, configuring a most significant bit of a modulation and coding scheme to 0, and configuring a bit of a redundancy version to 00.

The feedback unit 42 is further adapted to: when the downlink control information of the physical downlink control channel is in PDCCH DCI Format1A, feed back the channel state information through a detected first physical uplink control channel format which is activated by the base station by configuring a bit of a hybrid adaptive retransmission process number of the physical downlink control channel to all 0s, configuring a most significant bit of a modulation and coding scheme to 11111, configuring a bit of a redundancy version to 00, and configuring a bit of resource block indication to all 1s.

The apparatus for processing information provided in the embodiments of the present invention may implement the foregoing method embodiments. For specific function implementations, reference is made to description in the method embodiments, which are not described here again. The method and apparatus for processing information provided in the embodiments of the present invention are applicable to, but not limited to, the field of communication systems.

Persons of ordinary skill in the art should understand that, all or a part of processes in the method according to the embodiments may be accomplished by relevant hardware under instructions of a computer program. The program may be stored in a computer-readable storage medium. When the program is executed, the process of the method according to the embodiments of the present invention is performed. The storage medium may be a magnetic disk, an optical disk, a read-only memory (ROM), a random access memory (RAM), or the like.

The foregoing descriptions are merely specific embodiments of the present invention, but are not intended to limit the protection scope of the present invention. Changes or replacements readily apparent to persons skilled in the prior art within the technical scope of the present invention should fall within the protection scope of the present invention. Therefore, the protection scope of the present invention is subject to the protection scope of the claims.

What is claimed is:

1. A method for configuring downlink control information, the method comprising:
configuring, by a base station, at least one physical uplink control channel format for a user equipment, the configuring using a configuration indicating a format used for transferring resources of multiple channel state information reports;
sending, by the base station, downlink control information of a physical downlink control channel to the user equipment, wherein the downlink control information of the physical downlink control channel is in PDCCH DCI Format0 or PDCCH DCI Format1A or a PDCCH DCI format whose valid payload is the same as that of PDCCH DCI Format0;

activating or releasing, by the base station and through bit information configured in the downlink control information of the physical downlink control channel, the at least one physical uplink control channel format for the user equipment to feed back channel state information; and indicating, by the base station to the user equipment when the downlink control information of the physical downlink control channel is in PDCCH DCI Format0, to feed back periodic channel state information reports of different cells.

2. The method for configuring downlink control information according to claim 1, wherein the base station configures one physical uplink control channel format for the user equipment using radio resource control protocol (RRC) signaling, and wherein when the base station configures one physical uplink control channel format for the user equipment, the activating or releasing comprises:

when the downlink control information of the physical downlink control channel is in PDCCH DCI Format0, configuring, by the base station, a bit of resource block allocation and frequency hopping resource allocation of the downlink control information of the physical downlink control channel to all 1s, and configuring a bit of a modulation and coding scheme and a redundancy version to all 0s, to perform the activating or releasing; or when the downlink control information of the physical downlink control channel is in PDCCH DCI Format0, configuring, by the base station, a bit of resource block allocation and frequency hopping resource allocation of the downlink control information of the physical downlink control channel to all 0s, and configuring a bit of a modulation and coding scheme and a redundancy version to all 1s, to perform the activating or releasing; or when the downlink control information of the physical downlink control channel is in PDCCH DCI Format0, configuring, by the base station, a transmission power control TPC bit of the downlink control information of the physical downlink control channel to 00, configuring a cyclic shift bit of a demodulation reference signal DMRS to 000, and configuring a most significant bit of a modulation and coding scheme and a redundancy version to 0, to perform the activating or releasing; or when the downlink control information of the physical downlink control channel is in PDCCH DCI Format0, configuring, by the base station, a transmission power control TPC bit of the downlink control information of the physical downlink control channel to 00, configuring a cyclic shift bit of a reference signal DMRS to 000, configuring a bit of a modulation and coding scheme and a redundancy version to 11111, and configuring a bit of resource block indication and frequency hopping resource allocation to all 1s, to perform the activating or releasing; or when the downlink control information of the physical downlink control channel is in PDCCH DCI Format1A, configuring, by the base station, a bit of resource block allocation of the downlink control information of the physical downlink control channel to all 1s, and configuring a bit of a modulation and coding scheme to all 0s, to perform the activating or releasing; or when the downlink control information of the physical downlink control channel is in PDCCH DCI Format1A,
configuring, by the base station, a bit of resource block allocation of the downlink control information of the physical downlink control channel to all 0s, and configuring a bit of a modulation and coding scheme to all 1s, to perform the activating or releasing; or when the downlink control information of the physical downlink control channel is in PDCCH DCI Format1A, configuring, by the base station, a bit of a hybrid adaptive retransmission process number of the downlink control information of the physical downlink control channel to all 0s, configuring a most significant bit of a modulation and coding scheme to 0, and configuring a bit of a redundancy version to 00, to perform the activating or releasing; or when the downlink control information of the physical downlink control channel is in PDCCH DCI Format1A, configuring, by the base station, a bit of a hybrid adaptive retransmission process number of the downlink control information of the physical downlink control channel to all 0s, configuring a most significant bit of a modulation and coding scheme to 11111, configuring a bit of a redundancy version to 00, and configuring a bit of resource block indication to all 1s, to perform the activating or releasing.

3. The method for configuring downlink control information according to claim 2, wherein the indicating, by the base station to the user equipment, to feed back periodic channel state information reports of different cells comprises indicating, by the base station and through a channel state information request bit configured in the downlink control information of the physical downlink control channel, a manner for the user equipment to feed back a cell periodic channel state information report.

4. The method for configuring downlink control information according to claim 1, wherein the base station configures one physical uplink control channel format for the user equipment, wherein the downlink control information of the physical downlink control channel is in PDCCH DCI Format0, and wherein the activating or releasing comprises configuring, by the base station, a bit of resource block allocation and frequency hopping resource allocation of the downlink control information of the physical downlink control channel to all 1s, and configuring a bit of a modulation and coding scheme and a redundancy version to all 0s, to perform the activating or releasing.

5. The method for configuring downlink control information according to claim 1, wherein the base station configures one physical uplink control channel format for the user equipment, wherein the downlink control information of the physical downlink control channel is in PDCCH DCI Format0, and wherein the activating or releasing comprises configuring, by the base station, a bit of resource block allocation and frequency hopping resource allocation of the downlink control information of the physical downlink control channel to all 0s, and configuring a bit of a modulation and coding scheme and a redundancy version to all 1s, to perform the activating or releasing.

6. The method for configuring downlink control information according to claim 1, wherein the base station configures one physical uplink control channel format for the user equipment, wherein the downlink control information of the physical downlink control channel is in PDCCH DCI Format0, and wherein the activating or releasing comprises configuring, by the base station, a transmission power control TPC bit of the downlink control information of the physical downlink control channel to 00, configuring a cyclic shift bit of a demodulation reference signal DMRS to 000, and configuring a most significant bit of a modulation and coding scheme and a redundancy version to 0, to perform the activating or releasing.

7. The method for configuring downlink control information according to claim 1, wherein the base station configures one physical uplink control channel format for the user equipment, wherein the downlink control information of the physical downlink control channel is in PDCCH DCI Format0, and wherein the activating or releasing comprises configuring, by the base station, a transmission power control TPC bit of the downlink control information of the physical downlink control channel to 00, configuring a cyclic shift bit of a reference signal DMRS to 000, configuring a bit of a modulation and coding scheme and a redundancy version to 11111, and configuring a bit of resource block indication and frequency hopping resource allocation to all 1s, to perform the activating or releasing.

8. The method for configuring downlink control information according to claim 1, wherein the base station configures one physical uplink control channel format for the user equipment, wherein the downlink control information of the physical downlink control channel is in PDCCH DCI Format1A, and wherein the activating or releasing comprises configuring, by the base station, a bit of resource block allocation of the downlink control information of the physical downlink control channel to all 1s, and configuring a bit of a modulation and coding scheme to all 0s, to perform the activating or releasing.

9. The method for configuring downlink control information according to claim 1, wherein the base station configures one physical uplink control channel format for the user equipment, wherein the downlink control information of the physical downlink control channel is in PDCCH DCI Format1A, and wherein the activating or releasing comprises configuring, by the base station, a bit of resource block allocation of the downlink control information of the physical downlink control channel to all 0s, and configuring a bit of a modulation and coding scheme to all 1s, to perform the activating or releasing.

10. The method for configuring downlink control information according to claim 1, wherein the base station configures one physical uplink control channel format for the user equipment, wherein the downlink control information of the physical downlink control channel is in PDCCH DCI Format1A, and wherein the activating or releasing comprises configuring, by the base station, a bit of a hybrid adaptive retransmission process number of the downlink control information of the physical downlink control channel to all 0s, configuring a most significant bit of a modulation and coding scheme to 0, and configuring a bit of a redundancy version to 00, to perform the activating or releasing.

11. The method for configuring downlink control information according to claim 1, wherein the base station configures one physical uplink control channel format for the user equipment, wherein the downlink control information of the physical downlink control channel is in PDCCH DCI Format1A, and wherein the activating or releasing comprises configuring, by the base station, a bit of a hybrid adaptive retransmission process number of the downlink control information of the physical downlink control channel to all 0s, configuring a most significant bit of a modulation and coding scheme to 11111, configuring a bit of a redundancy version to 00, and configuring a bit of resource block indication to all 1s, to perform the activating or releasing.

12. A method for feeding back channel state information, comprising:
acquiring, by a user equipment, at least one physical uplink control channel format configured by a base station for the user equipment using a configuration indicating a format used for transferring resources of multiple channel state information reports;
acquiring, by the user equipment, downlink control information of a physical downlink control channel corresponding to the user equipment from downlink control information of a physical downlink control channel sent by the base station, wherein the downlink control information of the physical downlink control channel is in PDCCH DCI Format0 or PDCCH DCI Format1A or a PDCCH DCI format whose valid payload is the same as that of PDCCH DCI Format0;
acquiring, by the user equipment when the downlink control information of the physical downlink control channel is in PDCCH DCI Format0, an indication to feed back periodic channel state information reports of different cells; and
feeding back, by the user equipment, channel state information according to a physical uplink control channel format which is activated by the base station through bit information configured in the downlink control information of the physical downlink control channel corresponding to the user equipment.

13. The method for feeding back channel state information according to claim 12, wherein when the user equipment acquires one physical uplink control channel format configured by the base station, the feeding back comprises:
when the downlink control information of the physical downlink control channel is in PDCCH DCI Format0, feeding back, by the user equipment, the channel state information through a detected physical uplink control channel format which is activated by the base station by configuring a bit of resource block allocation and frequency hopping resource allocation of the downlink control information of the physical downlink control channel to all 1s, and configuring a bit of a modulation and coding scheme and a redundancy version to all 0s; or
when the downlink control information of the physical downlink control channel is in PDCCH DCI Format0, feeding back, by the user equipment, the channel state information through a detected physical uplink control channel format which is activated by the base station by configuring a bit of resource block allocation and frequency hopping resource allocation of the downlink control information of the physical downlink control channel to all 0s, and configuring a bit of a modulation and coding scheme and a redundancy version to all 1s; or
when the downlink control information of the physical downlink control channel is in PDCCH DCI Format0, feeding back, by the user equipment, the channel state information through a detected physical uplink control channel format which is activated by the base station by configuring a transmission power control TPC bit of the downlink control information of the physical downlink control channel to 00, configuring a cyclic shift bit of a reference signal DMRS to 000, and configuring a most significant bit of a modulation and coding scheme and a redundancy version to 0; or
when the downlink control information of the physical downlink control channel is in PDCCH DCI Format0, feeding back, by the user equipment, the channel state information through a detected physical uplink control channel format which is activated by the base station by configuring a transmission power control TPC bit of the physical downlink control channel to 00, configuring a cyclic shift bit of a reference signal DMRS to 000, and configuring a bit of a modulation and coding scheme and a redundancy version to 11111; or when the downlink control information of the physical downlink control channel is in PDCCH DCI Format0, feeding back, by the user equipment, the channel state information through a detected physical uplink control channel format which is activated by the base station by configuring a transmission power control TPC bit of the downlink control information of the physical downlink control channel to 00, configuring a cyclic shift bit of a reference signal DMRS to 000, configuring a bit of a modulation and coding scheme and a redundancy version to 11111, and configuring a bit of resource block indication and frequency hopping resource allocation to all 1s; or when the downlink control information of the physical downlink control channel is in PDCCH DCI Format1A, feeding back, by the user equipment, the channel state information through a detected physical uplink control channel format which is activated by the base station by configuring a bit of resource block allocation of the downlink control information of the physical downlink control channel to all 1s, and configuring a bit of a modulation and coding scheme to all 0s; or when the downlink control information of the physical downlink control channel is in PDCCH DCI Format1A, feeding back, by the user equipment, the channel state information through a detected physical uplink control channel format which is activated by the base station by configuring a bit of resource block allocation of the downlink control information of the physical downlink control channel to all 0s, and configuring a bit of a modulation and coding scheme to all 1s; or when the downlink control information of the physical downlink control channel is in PDCCH DCI Format1A, feeding back, by the user equipment, the channel state information through a detected physical uplink control channel format which is activated by the base station by configuring a bit of a hybrid adaptive retransmission process number of the downlink control information of the physical downlink control channel to all 0s, configuring a most significant bit of a modulation and coding scheme to 0, and configuring a bit of a redundancy version to 00; or when the downlink control information of the physical downlink control channel is in PDCCH DCI Format1A, feeding back, by the user equipment, the channel state information through a detected physical uplink control channel format which is activated by the base station by configuring a bit of a hybrid adaptive retransmission process number of the physical downlink control channel to all 0s, configuring a most significant bit of a modulation and coding scheme to 11111, configuring a bit of a redundancy version to 00, and configuring a bit of resource block indication to all 1s.

14. The method for feeding back channel state information according to claim 12, wherein when the user equipment acquires two physical uplink control channel formats configured by the base station the feeding back comprises:

when the downlink control information of the physical downlink control channel is in PDCCH DCI Format0, feeding back, by the user equipment, the channel state information through a detected first physical uplink control channel format which is activated by the base station by configuring a most significant bit MSB of transmission power control TPC, or configuring a cyclic shift MSB of a demodulation reference signal DMRS, or configuring a most significant bit or a least significant bit of a modulation and coding scheme and a redundancy version; or when the downlink control information of the physical downlink control channel is in PDCCH DCI Format0, feeding back, by the user equipment, the channel state information through a detected first physical uplink control channel format which is activated by the base station by configuring a bit of resource block allocation and frequency hopping resource allocation to all 1s, and configuring a bit of a modulation and coding scheme and a redundancy version to all 0s; or when the downlink control information of the physical downlink control channel is in PDCCH DCI Format0, feeding back, by the user equipment, the channel state information through a detected first physical uplink control channel format which is activated by the base station by configuring a transmission power control TPC bit of the physical downlink control channel to 00, configuring a cyclic shift bit of a reference signal DMRS to 000, and configuring a most significant bit of a modulation and coding scheme and a redundancy version to 0; or when the downlink control information of the physical downlink control channel is in PDCCH DCI Format0, feeding back, by the user equipment, the channel state information through a detected first physical uplink control channel format which is activated by the base station by configuring a transmission power control TPC bit of the downlink control information of the physical downlink control channel to 00, configuring a cyclic shift bit of a reference signal DMRS to 000, configuring a bit of a modulation and coding scheme and a redundancy version to 11111, and configuring a bit of resource block indication and frequency hopping resource allocation to all 1s; or when the downlink control information of the physical downlink control channel is in PDCCH DCI Format1A, feeding back, by the user equipment, the channel state information through a detected first physical uplink control channel format which is activated by the base station by configuring an MSB of the TPC, or configuring a flag bit of centralized or distributed virtual resource block allocation, or configuring a most significant bit or a least significant bit of a modulation and coding scheme; or when the downlink control information of the physical downlink control channel is in PDCCH DCI Format1A, feeding back, by the user equipment, the channel state information through a detected first physical uplink control channel format which is activated by the base station by configuring a bit of resource block allocation to all 1s, and configuring a bit of a modulation and coding scheme to all 0s; or when the downlink control information of the physical downlink control channel is in PDCCH DCI Format1A, feeding back, by the user equipment, the channel state information through a detected first physical uplink control channel format which is activated by the base station by configuring a bit of a hybrid adaptive retransmission process number of the downlink control information of the physical downlink control channel to all 0s, configuring a most significant bit of a modulation and coding scheme to 0, and configuring a bit of a redundancy version to 00; or when the downlink control information of the physical downlink control channel is in PDCCH DCI Format1A, feeding back, by the user equipment, the channel state information through a detected first physical uplink control channel format which is activated by the base station by configuring a bit of a hybrid adaptive retransmission process number of the physical downlink control channel to all 0s, configuring a most significant bit of a modulation and coding scheme to 11111, configuring a bit of a redundancy version to 00, and configuring a bit of resource block indication to all 1s.

15. An apparatus for configuring downlink control information, the apparatus comprising:
a transmitter, configured to configure at least one physical uplink control channel format for a user equipment using a configuration indicating a format used for transferring resources of multiple channel state information reports, the transmitter further configured to send downlink control information of a physical downlink control channel to the user equipment, wherein the downlink control information of the physical downlink control channel is in PDCCH DCI Format0 or PDCCH DCI Format1A or a PDCCH DCI format whose valid payload is the same as that of PDCCH DCI Format0, wherein the transmitter is further configured to indicate, to the user equipment when the downlink control information of the physical downlink control channel is in PDCCH DCI Format0, to feed back periodic channel state information reports of different cells; and
a processor connected to the transmitter;
a non-transitory computer readable medium connected to the processor and having instructions stored thereon that, when executed by the processor, cause the apparatus to activate or release, through bit information configured in the downlink control information of the physical downlink control channel, the at least one physical uplink control channel format for the user equipment to feed back channel state information.

16. The apparatus according to claim 15, wherein the non-transitory computer readable medium further has instructions stored thereon that, when executed by the processor, cause the apparatus to perform at least one of:
configure, in response to when the downlink control information of the physical downlink control channel is in PDCCH DCI Format0, a bit of resource block allocation and frequency hopping resource allocation of the downlink control information of the physical downlink control channel to all 1s, and a bit of a modulation and coding scheme and a redundancy version to all 0s, or,
configure, in response to the downlink control information of the physical downlink control channel being in PDCCH DCI Format0, a bit of resource block allocation and frequency hopping resource allocation of the downlink control information of the physical downlink control channel to all 0s, and a bit of a modulation and coding scheme and a redundancy version to all 1s to perform the activating or releasing; or
configure to perform the activating or releasing, and in response to downlink control information of the physical downlink control channel being in PDCCH DCI Format0, a power control (TPC) bit of the physical downlink control channel to 00, a cyclic shift bit of a reference signal DMRS to 000, and a most significant bit of a modulation and coding scheme and a redundancy version to 0 to perform the activating or releasing; or
configure to perform the activating or releasing, and in response to downlink control information of the physical downlink control channel being in PDCCH DCI Format0, a power control (TPC) bit of the physical downlink control channel to 00, a cyclic shift bit of a reference signal DMRS to 000, and a bit of a modulation and coding scheme and a redundancy version to 11111 to perform the activating or releasing; or
configure in response to downlink control information of the physical downlink control channel being in PDCCH DCI Format1A, a bit of resource block allocation of the downlink control information of the physical downlink control channel to all 1s, and further configure one of a bit of a modulation and coding scheme to all 0s to perform the activating or releasing; or
configure a, in response to downlink control information of the physical downlink control channel being in PDCCH DCI Format1A, bit of resource block allocation of the downlink control information of the physical downlink control channel to all 0s, and a bit of a modulation and coding scheme to all 1s to perform the activating or releasing; or
configure to perform the activating or releasing, and in response to downlink control information of the physical downlink control channel being in PDCCH DCI Format1A, a bit of a hybrid adaptive retransmission process number of the downlink control information of the physical downlink control channel to all 0s, a most significant bit of a modulation and coding scheme to 0, and a bit of a redundancy version to 00 to perform the activating or releasing; or
configure in response to downlink control information of the physical downlink control channel being in PDCCH DCI Format1A, a bit of a hybrid adaptive retransmission process number of the physical downlink control channel to all 0s, a most significant bit of a modulation and coding scheme to 11111, a bit of a redundancy version to 00, and a bit of resource block indication to all 1s to perform the activating or releasing.

17. The apparatus according to claim 16, wherein the transmitter is further configured to indicate, to the user equipment, to feed back periodic channel state information reports of different cells, through a channel state information request bit configured in the downlink control information of the physical downlink control channel, a manner for the user equipment to feed back a cell periodic channel state information report.

18. An apparatus for feeding back channel state information, comprising:
a receiver, configured to acquire at least one physical uplink control channel format configured by a base station for a user equipment using a configuration indicating a format used for transferring resources of multiple channel state information reports;
wherein the receiver is further configured to acquire downlink control information of a physical downlink control channel corresponding to the user equipment from downlink control information of a physical downlink control channel sent by the base station, wherein the downlink control information of the physical downlink control channel is in PDCCH DCI Format0 or PDCCH DCI Format1A or a PDCCH DCI format whose valid payload is the same as that of PDCCH DCI Format0, and wherein the receiver is further configured to acquiring, when the downlink control information of the physical downlink control channel is in PDCCH DCI Format0, an indication to feed back periodic channel state information reports of different cells; and a transmitter, configured to feed back channel state information according to a physical uplink control channel format which is activated by the base station through bit information configured in the downlink control information of the physical downlink control channel corresponding to the user equipment.

19. The apparatus for feeding back channel state information according to claim 18, wherein the transmitter is further configured to perform at least one of:

feed back, in response to the downlink control information of the physical downlink control channel being in PDCCH DCI Format0, the channel state information through a detected physical uplink control channel format which is activated by the base station by configuring a bit of resource block allocation and frequency hopping resource allocation of the downlink control information of the physical downlink control channel to all 1s, and by configuring a bit of a modulation and coding scheme and a redundancy version to all 0s; or feed back in response to the downlink control information of the physical downlink control channel being in PDCCH DCI Format0, the channel state information through a detected physical uplink control channel format which is activated by the base station by configuring a bit of resource block allocation and frequency hopping resource allocation of the downlink control information of the physical downlink control channel to all 0s, and by configuring a bit of a modulation and coding scheme and a redundancy version to all 1s; or feed back in response to the downlink control information of the physical downlink control channel being in PDCCH DCI Format0, the channel state information through a detected physical uplink control channel format which is activated by the base station by configuring a transmission power control TPC bit of the physical downlink control channel to 00, by configuring a cyclic shift bit of a reference signal DMRS to 000, and by a configuring a most significant bit of a modulation and coding scheme and a redundancy version to 0; or feed back in response to the downlink control information of the physical downlink control channel being in PDCCH DCI Format0, the channel state information through a detected physical uplink control channel format which is activated by the base station by configuring a transmission power control (TPC) bit of the physical downlink control channel to 00, by configuring a cyclic shift bit of a reference signal DMRS to 000, and by configuring a bit of a modulation and coding scheme and a redundancy version to 11111; or feed back in response to the downlink control information of the physical downlink control channel being in PDCCH DCI Format0, the channel state information through a detected physical uplink control channel format which is activated by the base station by configuring a transmission power control (TPC) bit of the downlink control information of the physical downlink control channel to 00, by configuring a cyclic shift bit of a reference signal DMRS to 000, configuring a bit of a modulation and coding scheme and a redundancy version to 11111, and by configuring a bit of resource block indication and frequency hopping resource allocation to all 1s; or feed back in response to the downlink control information of the physical downlink control channel being in PDCCH DCI Format1A, the channel state information through a detected physical uplink control channel format which is activated by the base station by configuring a bit of resource block allocation of the downlink control information of the physical downlink control channel to all 1s, and by configuring a bit of a modulation and coding scheme to all 0s; or feed back, in response to the downlink control information of the physical downlink control channel being in PDCCH DCI Format1A, the channel state information through a detected physical uplink control channel format which is activated by the base station by configuring a bit of resource block allocation of the downlink control information of the physical downlink control channel to all 0s, and by configuring a bit of a modulation and coding scheme to all 1s; or feed back in response to the downlink control information of the physical downlink control channel being in PDCCH DCI Format1A, the channel state information through a detected physical uplink control channel format which is activated by the base station by configuring a bit of a hybrid adaptive retransmission process number of the downlink control information of the physical downlink control channel to all 0s, by configuring a most significant bit of a modulation and coding scheme to 0, and by configuring a bit of a redundancy version to 00; or feed back in response to the downlink control information of the physical downlink control channel being in PDCCH DCI Format1A, the channel state information through a detected physical uplink control channel format which is activated by the base station by configuring a bit of a hybrid adaptive retransmission process number of the physical downlink control channel to all 0s, by configuring a most significant bit of a modulation and coding scheme to 11111, by configuring a bit of a redundancy version to 00, and by configuring a bit of resource block indication to all 1s.

20. The apparatus according to claim 18, wherein the transmitter is further configured to perform at least one of:

feed back, in response to the downlink control information of the physical downlink control channel being in PDCCH DCI Format0, the channel state information through a detected first physical uplink control channel format which is activated by the base station by at least one of configuring a most significant bit MSB of transmission power control TPC, or configuring a cyclic shift MSB of a demodulation reference signal DMRS, or configuring at least one of a most significant bit or a least significant bit of a modulation and coding scheme and a redundancy version; or feed back, in response to the downlink control information of the physical downlink control channel being in PDCCH DCI Format0 the channel state information through a detected first physical uplink control channel format which is activated by the base station by configuring a bit of resource block allocation and frequency hopping resource allocation to all 1s, and by configuring a bit of a modulation and coding scheme and a redundancy version to all 0s; or feed back, in response to the downlink control information of the physical downlink control channel being in PDCCH DCI Format0, the channel state information through a detected first physical uplink control channel format which is activated by the base station by configuring a transmission power control TPC bit of the physical downlink control channel to 00, by configuring a cyclic shift bit of a reference signal DMRS to 000, and by configuring a most significant bit of a modulation and coding scheme and a redundancy version to 0; or feed back, in response to the downlink control information of the physical downlink control channel being in PDCCH DCI Format0 the channel state information through a detected first physical uplink control channel format which is activated by the base station by configuring a transmission power control TPC bit of the physical downlink control channel to 00, by configuring a cyclic shift bit of a reference signal DMRS to 000, and by configuring a bit of a modulation and coding scheme and a redundancy version to 11111; or feed back, in response to the downlink control information of the physical downlink control channel being in PDCCH DCI Format1A, the channel state information through a detected first physical uplink control channel format which is activated by the base station by at least one of configuring an MSB of the TPC, or configuring a flag bit of centralized or distributed virtual resource block allocation, or configuring at least one of a most significant bit or a least significant bit of a modulation and coding scheme; or feed back, in response to the downlink control information of the physical downlink control channel being in PDCCH DCI Format1A, the channel state information through a detected first physical uplink control channel format which is activated by the base station by configuring a bit of resource block allocation to all 1s, and by configuring a bit of a modulation and coding scheme to all 0s; or feed back, in response to the downlink control information of the physical downlink control channel being in PDCCH DCI Format1A, the channel state information through a detected first physical uplink control channel format which is activated by the base station by configuring a bit of a hybrid adaptive retransmission process number of the downlink control information of the physical downlink control channel to all 0s, by configuring a most significant bit of a modulation and coding scheme to 0, and by configuring a bit of a redundancy version to 00; or feed back, in response to the downlink control information of the physical downlink control channel being in PDCCH DCI Format1A, the channel state information through a detected first physical uplink control channel format which is activated by the base station by configuring a bit of a hybrid adaptive retransmission process number of the physical downlink control channel to all 0s, by configuring a most significant bit of a modulation and coding scheme to 11111, by configuring a bit of a redundancy version to 00, and by configuring a bit of resource block indication to all 1s.

* * * * *

UNITED STATES PATENT AND TRADEMARK OFFICE
CERTIFICATE OF CORRECTION

PATENT NO.       : 9,345,044 B2                                                 Page 1 of 1
APPLICATION NO.  : 14/303193
DATED            : May 17, 2016
INVENTOR(S)      : Zhenfei Tang It is certified that error appears in the above-identified patent and that said Letters Patent is hereby corrected as shown below:

In the Claims

In Col. 23, line 49, claim 16, delete "all 0s, or," and insert --all 0s; or,--.

In Col. 23, line 58, claim 16, delete "configure" and insert --configure,--.

In Col. 23, line 66, claim 16, delete "configure" and insert --configure,--.

In Col. 24, line 7, claim 16, delete "configure" and insert --configure,--.

In Col. 24, line 22, claim 16, delete "configure" and insert --configure,--.

In Col. 25, line 37, claim 19, delete "000, and by a" and insert --000, and by--.

Signed and Sealed this
Second Day of August, 2016

Michelle K. Lee
*Director of the United States Patent and Trademark Office*